(12) United States Patent
Lemcke et al.

(10) Patent No.: US 7,769,762 B2
(45) Date of Patent: Aug. 3, 2010

(54) METHOD AND SYSTEM FOR CONSOLIDATING DATA TYPE REPOSITORIES

(75) Inventors: Jens Lemcke, Karlsruhe (DE); Thomas Hille, Berlin (DE)

(73) Assignee: SAP AG, Walldorf (DE)

( * ) Notice: Subject to any disclaimer, the term of this patent is extended or adjusted under 35 U.S.C. 154(b) by 636 days.

(21) Appl. No.: 11/641,264

(22) Filed: Dec. 19, 2006

(65) Prior Publication Data

US 2008/0147713 A1    Jun. 19, 2008

(51) Int. Cl.
*G06F 17/00* (2006.01)
(52) U.S. Cl. ...................................... 707/748; 707/778
(58) Field of Classification Search ................. 707/778, 707/748
See application file for complete search history.

(56) References Cited

U.S. PATENT DOCUMENTS

| | | | |
|---|---|---|---|
| 6,415,287 B1 | 7/2002 | Wang et al. | |
| 6,721,719 B1 | 4/2004 | Aggarwal | |
| 2003/0145277 A1* | 7/2003 | Neal et al. | 715/509 |
| 2005/0198617 A1* | 9/2005 | Kim et al. | 717/109 |
| 2005/0278325 A1* | 12/2005 | Mihalcea et al. | 707/6 |
| 2006/0174024 A1 | 8/2006 | Chi et al. | |
| 2007/0006203 A1* | 1/2007 | Marwinski | 717/166 |

OTHER PUBLICATIONS

Agrawal, R., Srikant, R.: Fast algorithms for mining association rules. In Bocca, J.B., Jarke, M., Zaniolo, C., eds.: Proc. 20th Int. Conf. Very Large Data Bases, VLDB, Morgan Kaufmann (1994) 487-499.
Calders, T., Goethals, B.: Mining all non-derivable frequent itemsets. In Elomaa, T., Mannila, H., Toivonen, H., eds.: Proceedings of the 6th European Conference on Principles of Data Mining and Knowledge Discovery. vol. 2431 of Lecture Notes in Computer Science., Springer-Verlag (2002) 74-85.

(Continued)

*Primary Examiner*—James Trujillo
*Assistant Examiner*—Fatima P Mina
(74) *Attorney, Agent, or Firm*—Brake Hughes Bellermann LLP

(57) ABSTRACT

A method and system are described for generating consolidation groups. An example method includes obtaining a plurality of data type indicators of data types, wherein each data type indicator is associated with a hierarchical subtype of the data type; generating a first subtype indicator of a first hierarchical subtype associated with a first data type indicator in a first hierarchical subtype relationship; generating a first parent list including one or more representations of one or more of the data types associated with the first hierarchical subtype; generating a second subtype indicator of a second hierarchical subtype associated with a second data type indicator in a second hierarchical subtype relationship; generating a second parent list including a representation of one of the plurality of data types associated with the second hierarchical subtype; and generating a first consolidation group based on combining the first subtype indicator with the second subtype indicator.

24 Claims, 13 Drawing Sheets

OTHER PUBLICATIONS

Han, J., Kamber, M.: Data Mining. Concepts and Techniques. Morgan Kaufmann Publishers (Mar. 2006), pp. 227-282.

Shvaiko, P., Euzenat, J.: A survey of schema-based matching approaches. In Spaccapietra, S., ed.: J. Data Semantics IV. vol. 3730 of Lecture Notes in Computer Science, Springer (Dec. 17, 2005) 146-171.

Zaki, Mohammed J.: Efficiently mining frequent trees in a forest (2002) In KDD '02: 8th ACM SIGKDD International Conference on Knowledge Discovery and Data Mining, Jul. 2002.

Zaki, M.J., Gouda, K.: Fast vertical mining using diffsets. In: KDD '03: Proceedings of the ninth ACM SIGKDD international conference on Knowledge discovery and data mining, New York, NY, USA, ACM Press (2003) 326-335.

* cited by examiner

```
<? xml version ="1.0" encoding ="UTF -8"?>
<xsd:schema xmlns:xsd ="http://www.w3.org/2001/XMLSchema">
  <xsd:complexType name ="Person">
    <xsd:sequence>
      <xsd:element name ="ID" type ="ID" minOccurs ="0"/>
      <xsd:complexType name ="Address">
        <xsd:sequence>
          <xsd:element name ="Name" type ="Name" minOccurs ="0"/>
          <xsd:element name ="PhysicalAddress" minOccurs ="0"/>
        </xsd:sequence>
      </xsd:complexType>
    </xsd:sequence>
  </xsd:complexType>
</xsd:schema>
```

FIG. 3

METHOD AND SYSTEM FOR CONSOLIDATING DATA TYPE REPOSITORIES

TECHNICAL FIELD

This description relates to repositories and consolidation techniques.

BACKGROUND

With the growth of information technology (IT) industries, the production of information entities has recently accelerated rapidly. Large software vendors may need to maintain increasing amounts of software artifacts upon which their products are based. Reuse of existing entities has been a common approach to attempt to reduce further development and maintenance costs. This task typically requires extra work, and is thus expensive. However, the "time to market" of new or adapted products and services has been an important measure for a company to succeed in a quickly changing and highly competitive industry sector. Thus, there may exist a trade-off between software quality and the agility of an IT company which may impact its success. Therefore, effective techniques for supporting software quality assurance may free resources to assist in a company's competitive advantage.

An object-oriented approach to re-use has led to the development of local libraries of software components that may use proprietary objects or data types to define their inputs and outputs. An industrial need for a more flexible integration of companies has led to the development of Web service technologies that has provided standardized languages to specify the storage (e.g., Universal Description, Discovery and Integration (UDDI)), interfaces (e.g., Web Service Description Language (WSDL)) and communication (e.g., Simple Object Access Protocol (SOAP)) of software components that are currently available over the Internet. These standards anticipate the data that Web services exchange to be eXtensible Markup Language (XML) data types, defined by XML schema definitions (XSD).

In the area of data mining, a "closed frequent itemset mining" technique may be used for the mining of frequent patterns, associations, and correlations, originally intended as part of a market basket analysis. Gaining knowledge regarding which products are purchased simultaneously in one business transaction by a customer has become an important part of the design of many marketing strategies. Conventional association mining algorithms may try to extract information regarding which "itemsets" may appear as a whole in different "transactions." For example, the mining algorithms may try to extract information such as names of items such as "bread" and "butter" that may have been purchased simultaneously by "Bob" in transaction T1 and by "Jane" in transaction T2. For example, such information may be useful in marketing decisions regarding whether to place bread and butter in close proximity to each other in a supermarket.

Various conventional frequent itemset mining approaches may be categorized as either horizontal or vertical techniques. Thus, example horizontal approaches may save for every parent data type a list of all of its sub data types. Example vertical approaches save for every sub data type the list of all parents where the sub data type appears. Example conventional vertical approaches may build candidate n-itemsets step by step, and then explore these itemsets in their data base. Thus, these conventional algorithms may be categorized as "one-shot" techniques. Thus, it may be desirable to provide techniques which may improve efficiencies by providing results at an early stage in processing.

SUMMARY

According to one general aspect, a system includes a model row generator configured to obtain a plurality of data type indicators of data types, wherein each data type indicator is associated with one or more hierarchical subtypes of the data type, generate a first subtype indicator of a first hierarchical subtype associated with a first one of the plurality of data type indicators in a first hierarchical subtype relationship, generate a first parent list including one or more representations of one or more of the plurality of data types associated with the first hierarchical subtype, wherein the first parent list includes a representation of the first one of the plurality of data types, generate a second subtype indicator of a second hierarchical subtype associated with a second one of the plurality of data type indicators in a second hierarchical subtype relationship, and generate a second parent list including one or more representations of one or more of the plurality of data types associated with the second hierarchical subtype, wherein the second parent list includes a representation of the second one of the plurality of data types. The system further includes a consolidation engine configured to generate a first consolidation group based on combining the first subtype indicator with the second subtype indicator and comparing the first parent list with the second parent list.

According to another aspect, a method includes obtaining a plurality of data type indicators of data types, wherein each data type indicator is associated with one or more hierarchical subtypes of the data type. The method further includes generating a first subtype indicator of a first hierarchical subtype associated with a first one of the plurality of data type indicators in a first hierarchical subtype relationship. A first parent list may be generated including one or more representations of one or more of the plurality of data types associated with the first hierarchical subtype, wherein the first parent list includes a representation of the first one of the plurality of data types. The method further includes generating a second subtype indicator of a second hierarchical subtype associated with a second one of the plurality of data type indicators in a second hierarchical subtype relationship and generating a second parent list including one or more representations of one or more of the plurality of data types associated with the second hierarchical subtype, wherein the second parent list includes a representation of the second one of the plurality of data types. Further, the method may include generating a first consolidation group based on combining the first subtype indicator with the second subtype indicator and comparing the first parent list with the second parent list.

According to yet another aspect, a computer program product is tangibly embodied on a computer-readable medium and is configured to cause a data processing apparatus to obtain a plurality of data type indicators of data types, wherein each data type indicator is associated with one or more hierarchical subtypes of the data type, generate a first subtype indicator of a first hierarchical subtype associated with a first one of the plurality of data type indicators in a first hierarchical subtype relationship, generate a first parent list including one or more representations of one or more of the plurality of data types associated with the first hierarchical subtype, wherein the first parent list includes a representation of the first one of the plurality of data types, generate a second subtype indicator of a second hierarchical subtype associated with a second one of the plurality of data type indicators in a second hierarchical subtype relationship, generate a second parent list including one or more representations of one or more of the plurality of data types associated with the second hierarchical subtype, wherein the second parent list includes a representation of the second one of the plurality of data types, and generate a first consolidation group based on combining the first subtype indicator with the second subtype indicator and comparing the first parent list with the second parent list.

The details of one or more implementations are set forth in the accompanying drawings and the description below. Other features will be apparent from the description and drawings, and from the claims.

BRIEF DESCRIPTION OF THE DRAWINGS

FIG. 3 depicts an example eXtensible markup language (XML) format data type according to an example embodiment.

DETAILED DESCRIPTION

Figure 1:
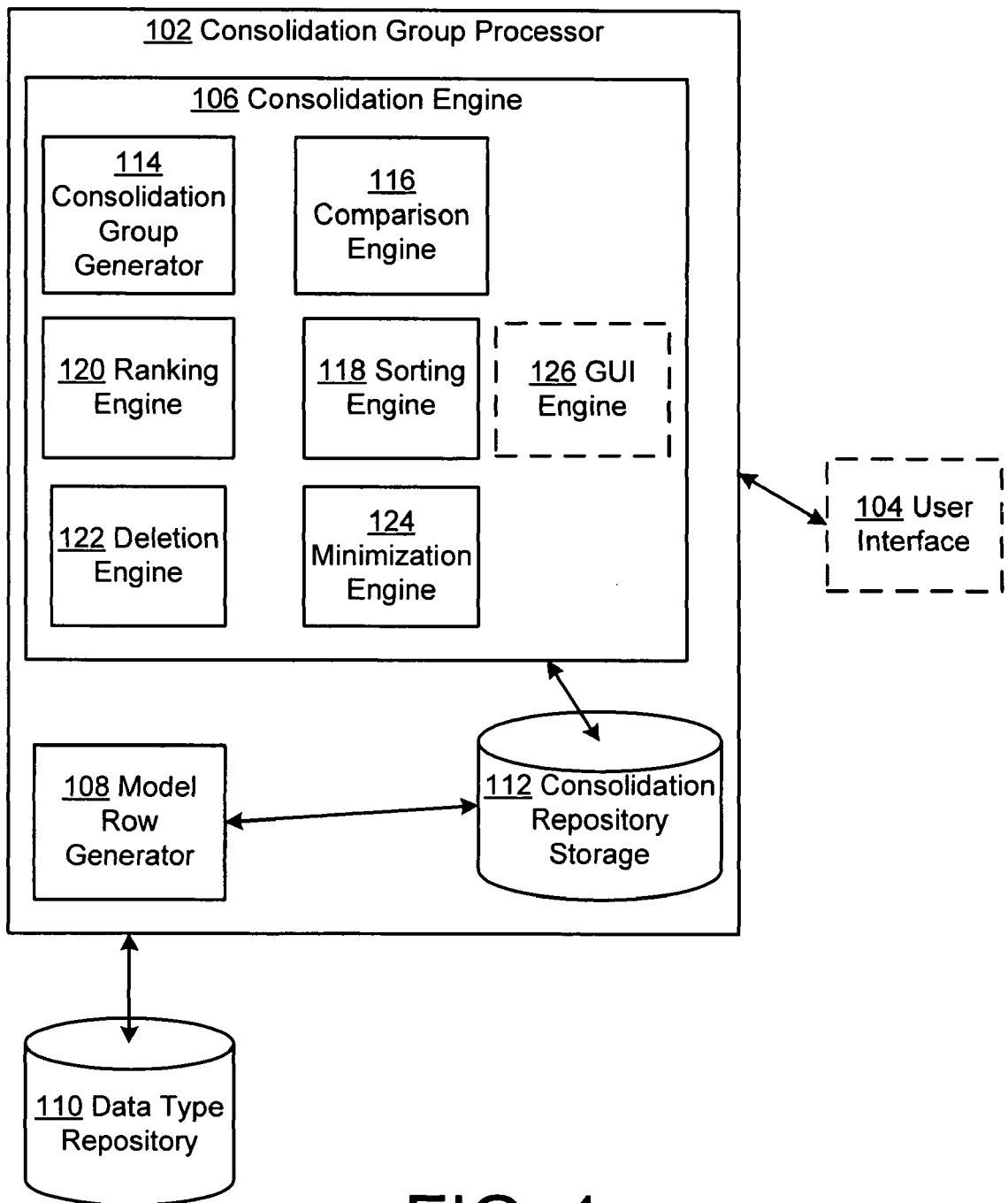
FIG. 1 is a block diagram of an example system for generating and processing consolidation groups.

FIG. 1 is a block diagram of a system 100 for generating and processing consolidation groups, for example, consolidation groups of data types. In the example of FIG. 1, consolidation group processor 102 includes various processing engines that provide and process consolidation groups that may be displayed, for example, for users via a user interface 104. For example, the user may view via a graphical user interface consolidation groups associated with data types, for example, eXtensible markup language (XML) data types included in a large repository. For example, the user may choose to construct a user-defined data type based on one or more consolidation groups presented to the user.

The consolidation group processor 102 may include a consolidation engine 106 that may include various processing engines and processors that provide and process consolidation groups. Example inputs to the consolidation engine 106 may be provided by a model row generator 108 that may be configured to process data types, for example, data types stored in a data type repository 110. The data types stored in the data type repository 110 may include data type indicators of data types, wherein the data type indicators may be associated with one or more hierarchical subtypes of each data type. For example, the data types may include eXtensible Markup Language (XML) data types. For example, a data type indicator such as "EmployeeName" may be associated with hierarchical subtypes such as "FirstName," "MiddleName," "LastName," and "MiddleInitial." For this example, the data type "EmployeeName" may include the hierarchical subtypes "FirstName," "MiddleName," "LastName" as direct subtypes or subelements, and the hierarchical subtype "MiddleInitial" may be included as a direct subtype or subelement, for example, of "MiddleName." Thus, there may exist more than one hierarchical level of subtypes associated with a data type. Further, the direct hierarchical subtypes such as "FirstName," "MiddleName," and "LastName" may be referred to herein as having a parent data type "EmployeeName," and the direct hierarchical subtype such as "MiddleInitial" may be referred to herein as having a parent data type "MiddleName."

The model row generator 108 may convert data types stored in the data type repository 110 into entries of a model row of a data structure, for example, a repository structure which may be stored in a consolidation repository storage area 112, such that an entry may include a hierarchical subtype indicator and a parent list, wherein the parent list may include one or more indicators of parent data types associated with the hierarchical subtype indicator, according to the data types stored in the data type repository 110 as discussed further below. The entries of the model row may then be used, for example, by the consolidation engine 106 to generate consolidation groups.

The consolidation engine 106 may include a consolidation group generator 114 that may be configured, for example, to generate consolidation groups based on combining subtype indicators and comparing associated parent lists associated with corresponding row entries of the repository structure. A comparison engine 116 may be configured to intersect the parent lists included with the corresponding row entries to provide a combined list of parent data types associated with a particular hierarchical subtype indicator. For example, a hierarchical subtype "Name" and a hierarchical subtype "PhysicalAddress" may be included as direct subtypes of a data type "Address" stored in the data type repository 110. Thus, a first row entry for the hierarchical subtype "Name" may include a representation of "Address" in a corresponding parent list. Similarly, a second row entry for the hierarchical subtype "PhysicalAddress" may include a representation of "Address" in a corresponding parent list. The consolidation group generator 114 may combine the first and second row entries, for example, by combining at least the hierarchical subtypes "Name" and "PhysicalAddress" to provide a consolidation group including the combined hierarchical subtypes, and the comparison engine 116 may intersect the corresponding parent lists to provide a combined parent list that may include at least a representation of the data type "Address." The result may be stored as a new row entry in the repository structure.

The consolidation engine 106 may also include a sorting engine 118 that may be configured, for example, to sort the entries of each row of the repository structure into either ascending or descending order based on the number of parents included in the parent list associated with each row entry. When two entries have the same number of parents, they may, for example, be sorted alphabetically. Further, a ranking engine 120 may be configured, for example, to generate a ranking value for each row entry based on a ranking function as discussed further below. For example, the ranking function may be configured to assign a higher rank value to an entry that may represent a larger number of data types of the data type storage area, so that such an entry may be processed at a higher priority, for example, in reducing the number of data types by providing a user with an opportunity to generate new combined data types.

The consolidation engine 106 may include a deletion engine 122 that may be configured, for example, to delete row entries that may be considered unnecessary for further consideration in generation of consolidation groups. For example, after the consolidation group generator 114 has combined one entry of a row of the repository structure with every other entry of the row, the deletion engine 122 may delete every old entry that is contained in a newly generated entry, for example, a combined new entry. For example, the deletion engine 122 may delete an entry that may include only data subtypes that are included in the new entry, and that may include only representations of parent data types in the associated parent list that are included in the new entry.

The consolidation engine 106 may further include a minimization engine 124 that may be configured, for example, to delete all entries of a row of the repository structure that include only one parent representation in the parent list associated with the entry, after a round of consolidation. Thus, the minimization engine 124 may delete entries associated with a data type that does not share a common hierarchical data subtype with another data type.

The consolidation engine 106 may further include a graphical user interface (GUI) engine 126 that may be configured, for example, to present a user of the user interface 104 with a view of consolidation groups, for example, after every iteration of consolidation of the repository structure so that, for example, the user may generate a new "combined" data type based on one or more consolidation groups provided by the consolidation engine 106. Thus, a user may quickly be able to utilize results of the example consolidation techniques to effectively manage large data type repositories.

One skilled in the art of data processing will appreciate that many different types of hierarchical data types may be used by the consolidation group processor 102. Further, there may be many different ways a user may handle the consolidation groups to more effectively manage repositories such as data type repositories.

Example methods and systems are discussed herein for generating consolidation groups. According to an example embodiment, an example repository of XML data types may be consolidated. Such a repository may include of a set of XML schema definitions (XSDs). Example XSDs may be referred to herein as trees of "simple types," "complex types," and "element types." Each of these types may be referred to herein as "elements" or "types," "data types," or "XML data types." The set of direct children of an element may be referred to herein as "subelements" or "subtypes." Conversely, the set of direct parents of an element may be referred to herein as "parents." As discussed herein, the structure of example XSDs may be considered without consideration of additional features such as cardinality, sequence, or choice of subelements. Thus, it may be possible to identify groups of data types that may share a "common core" of equivalent subelements, or shared or common subtypes.

Thus, the core of these data types may be used to create a new re-usable data type. The new data type may be referenced by the group members, instead of requiring that each member include a copy of the whole core. Therefore, a particular group may be considered as more important to the consolidation process than other groups, and may be referred to herein, for example, as a "consolidation group" if the group's core is determined to be large, and/or if the group is determined to be large.

One skilled in the art will appreciate that the techniques discussed herein may differ from general clustering techniques conventionally used for data mining. For example, clustering techniques may assign a specific similarity value to each pair of entities. Based on these similarity values, a clustering technique may divide the entities into a set of clusters such that entities included in one cluster may be selected to be as homogeneous as possible and entities included in different clusters may be selected to be as heterogeneous as possible. By applying a general similarity measure, no rationale is then provided for the commonality of the entities in a cluster. Example techniques discussed herein may differ from conventional clustering in many respects, for example, an example technique discussed herein may identify the common core of data types which may provide a rationale for the data types to be included in the same consolidation group.

Figure 2:
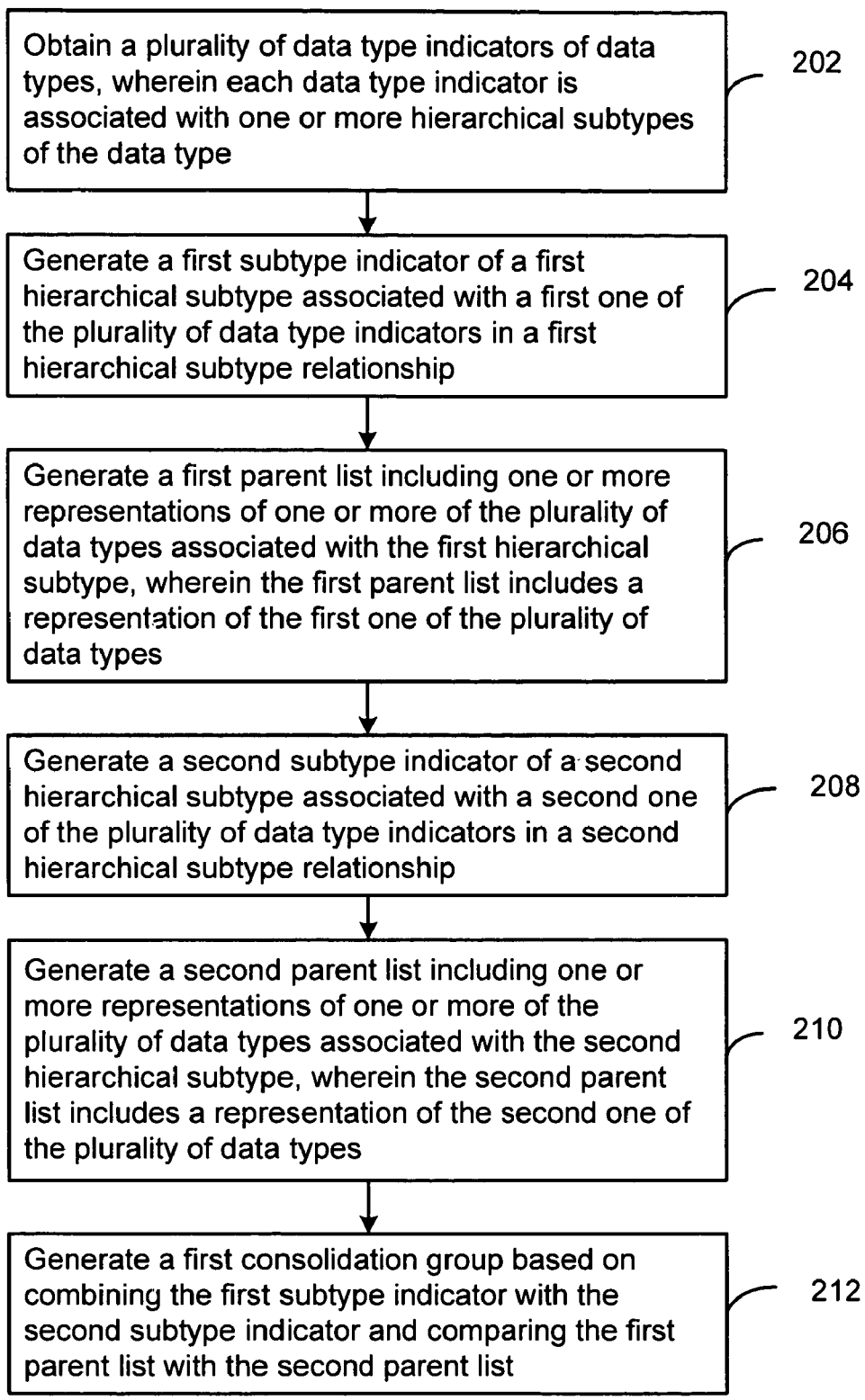
FIG. 2 is a flowchart illustrating an operation of the example system of FIG. 1.

FIG. 2 is a flowchart illustrating an example operation of the system of FIG. 1. At 202, a plurality of data type indicators of data types may be obtained, wherein each data type indicator is associated with one or more hierarchical subtypes of each of the data types. For example, the data type indicators of data types may be obtained by the model row generator 108 based on the data type repository 110, as discussed previously. For example, data type indicator of "Address" may be obtained, the data type including a hierarchical subtype "Name" and a hierarchical subtype "PhysicalAddress" as discussed previously.

At 204, a first subtype indicator of a first hierarchical subtype associated with a first one of the plurality of data type indicators in a first hierarchical subtype relationship may be generated. For example, the model row generator 108 may generate a first subtype indicator "Name" for the data type "Address."

At 206, a first parent list including one or more representations of one or more of the plurality of data types associated with the first hierarchical subtype, wherein the first parent list includes a representation of the first one of the plurality of data types, may be generated. For example, the model row generator 108 may generate the first parent list including a representation of the parent "Address."

At 208, a second subtype indicator of a second hierarchical subtype associated with a second one of the plurality of data type indicators in a second hierarchical subtype relationship may be generated. For example, the model row generator 108 may generate a second subtype indicator "PhysicalAddress" for the data type "Address." At 210, a second parent list including one or more representations of one or more of the plurality of data types associated with the second hierarchical subtype may be generated. For example, the model row generator 108 may generate the second parent list including a representation of the parent "Address."

At 212, a first consolidation group may be generated based on combining the first subtype indicator with the second subtype indicator and comparing the first parent list with the second parent list. For example, the consolidation group generator 114 may combine the first subtype indicator "Name" and the second subtype indicator "PhysicalAddress" and the comparison engine 116, for example, may compare the first parent list including a representation of the parent "Address" with the second parent list including a representation of the parent "Address." For this example, the parent lists have a nonempty intersection, and thus the first and second subtype indicators may be combined to generate a consolidation group, and the first and second parent lists may be intersected.

An example technique similar to a vertical association mining technique may be used to generate consolidation groups. However, data types such as XML data types may need to be converted into a vertical format, for example, by the model row generator 108, before the consolidation engine 106 may begin example consolidation techniques. Example optimization techniques may be included in the example consolidation techniques as discussed below. The results of the consolidation techniques may be mapped back to the original data types, for example the original XML data types, by the GUI engine 126, and may be presented to a user, for example, via the user interface 104.

According to an example embodiment, an iterative technique may quickly generate large candidate itemsets based on suitable heuristics. Further, redundant information may be removed from the output based on "closed frequent itemset mining." Thus, redundant information may be removed during processing by the consolidation engine 102, which may efficiently reduce execution time, thus providing more efficient computation of non-redundant results During processing, the data types such as XML data types may be represented internal to the consolidation engine 106 in accordance with an example consolidation repository storage area 112 format that may be used, for example, for intermediate results. Thus, data may generally be stored in a consolidation "repository" that includes "rows." Each row may include "entries" in which representations of data types may be stored. Each entry may include of a combination of subtype indicators and of a set or list of all parents that contain the subtype indicators in the original information included in the data type repository 110. The example model row generator 108 may generate a model row, or the first row of the consolidation repository. This row may also be referred to herein as a "model row" or "modeler row." According to an example embodiment, the example model row generator 108 may generate the first row, for example, based on traversing an XML Schema Definition (XSD) tree of the XML data types to be consolidated. For each data subtype in the XSD trees, the model row generator 108 may determine whether such an entry already exists in the consolidation repository. If not, the model row generator 108 may generate a new entry including the subtype or sub data type (SDT) and its parent or parent data type (PDT). Otherwise, the model row generator 108 may add the parent or PDT to the set of parents of the already existing entry for the subtype or SDT of the parent. After the model row generator 108 has processed all data types to be consolidated, thus generating the modeler row, the remaining rows of the repository may be filled by the consolidation engine 106 as discussed below.

FIG. 3 depicts an example eXtensible markup language (XML) format data type 300, or XML schema definition (XSD) file, according to an example embodiment. As shown, the example data type 300 includes a structure including an example XML element "complexType" 302 that includes subelements or subtypes "ID" 304 which is shown as an "element," and "Address" 306 which is shown as a "complex type." The subtype "Address" further includes a structure including a subtype "Name" 308 and a subtype "PhysicalAddress" 310 which are both shown as "elements." For example, the data type repository 110 may include a repository of data types such as the data type 300.

Figure 4:
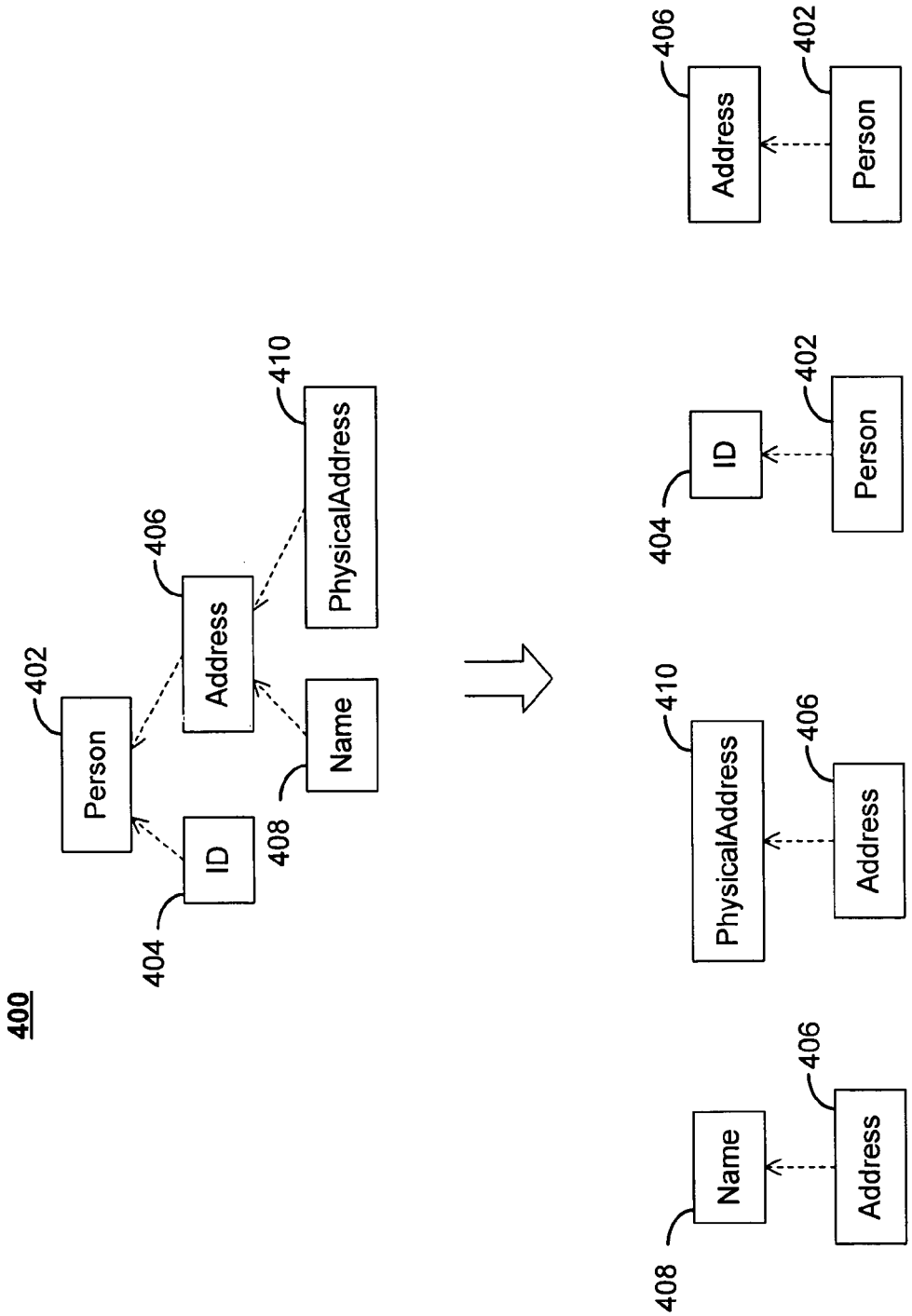
FIG. 4 depicts an example hierarchical representation of the data type of FIG. 3 converted to a row entry format according to an example embodiment.

FIG. 4 depicts an example hierarchical representation of the data type 300 of FIG. 3 converted to a row entry format according to an example embodiment. For the example of FIG. 4, only direct subelements or direct subtypes are considered as being included in a definition of a data type. As shown in FIG. 4, the XML format data type 300 may be represented in a tree format, including a root of the data type "Person" 402, with child nodes or direct subtypes "ID" 404 and "Address" 406. The subtype "Address" 406 further includes child nodes or direct subtypes "Name" 408 and "PhysicalAddress" 410. The nodes of the tree structure may correspond, for example, to the hierarchical structure associated with the data type 300 of FIG. 3.

As discussed previously, the model row generator 108 may generate row entries of a repository structure based on the data types of the data type repository 110. Thus, the model row generator 108 may generate a modeler row for the consolidation repository storage area 112 based on the hierarchical subtypes associated with the data types included in the data type repository 110. For example, a first entry in the modeler row may include the hierarchical subtype "Name" 408 and a parent list including a representation of the data type "Address" 406. A second example entry in the modeler row may include the hierarchical subtype "PhysicalAddress" 410 and a parent list including a representation of the data type "Address" 406. A third example entry in the modeler row may include the hierarchical subtype "ID" 404 and a parent list including a representation of the data type "Person" 402. A fourth example entry in the modeler row may include the hierarchical subtype "Address" 406 and a parent list including a representation of the data type "Person" 402. The modeler row may then be used as input to the consolidation engine 106 for generating consolidation groups as discussed previously.

Figure 5:
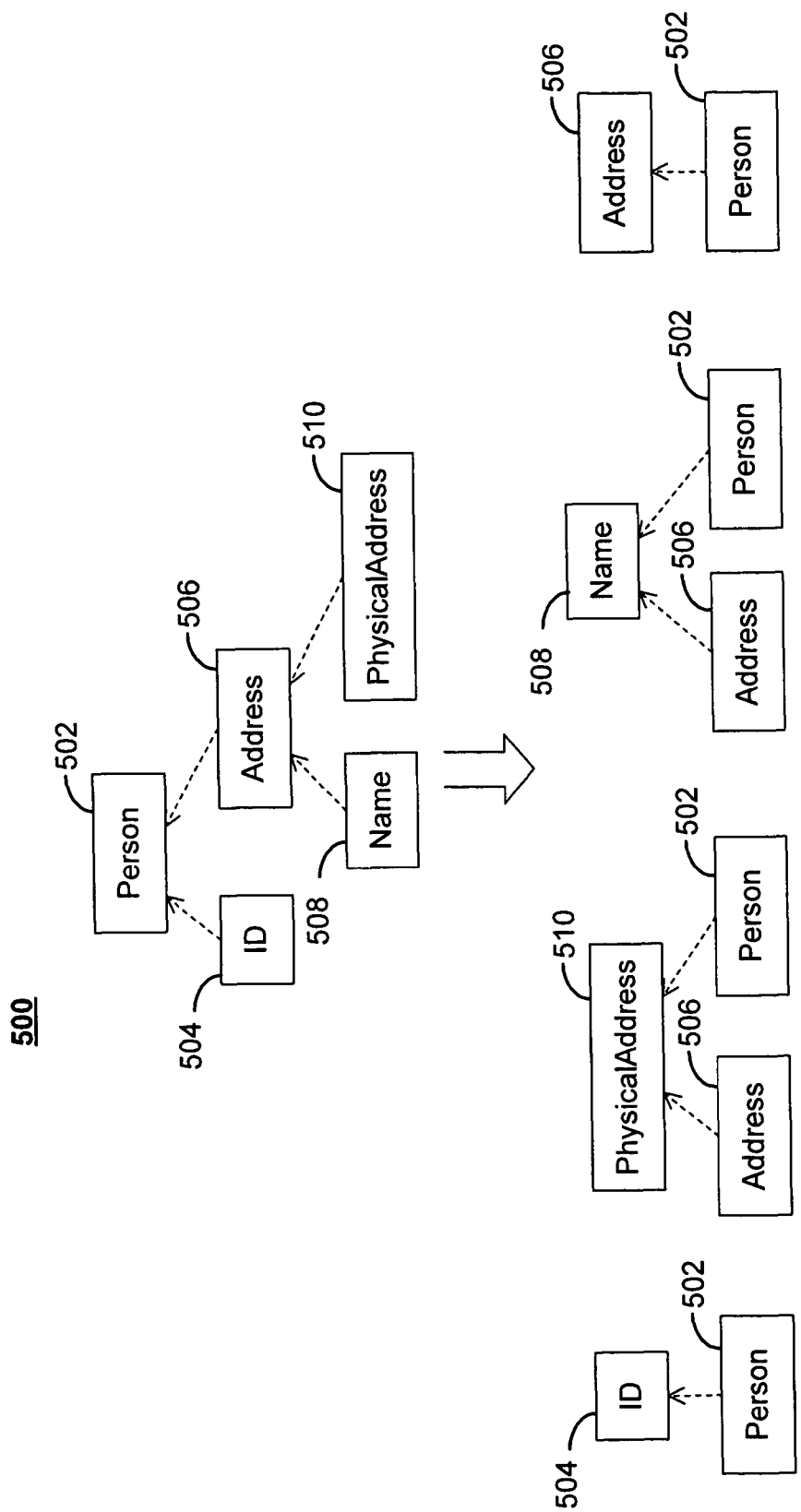
FIG. 5 depicts an example hierarchical representation of the data type of FIG. 3 converted to a row entry format according to an example embodiment.

FIG. 5 depicts an example hierarchical representation of the data type 300 of FIG. 3 converted to a row entry format according to an example embodiment. The example of FIG. 5 is similar to the example of FIG. 4; however for the example of FIG. 5, all subelements or subtypes are considered as being included in a definition of a data type. Thus, for an element in the data type tree structure, a set of parents may include all direct and indirect parents, or ancestors of a particular hierarchical subtype of a data type, which may include two or more levels of a hierarchical structure. Thus, an extended mode may include a representation of more comprehensive containment information regarding hierarchical subelements or hierarchical subtypes of data types included in the data type repository 110. As shown in FIG. 5, the XML format data type 300 may be represented in a tree format similarly as discussed previously with regard to FIG. 4.

As discussed previously, the model row generator 108 may generate row entries of a repository structure based on the data types of the data type repository 110. Thus, the model row generator 108 may generate a modeler row for the consolidation repository storage area 112 based on the hierarchical subtypes associated with the data types included in the data type repository 110. For example, a first entry in the modeler row may include the hierarchical subtype "ID" 504 and a parent list including a representation of the data type "Person" 502. A second example entry in the modeler row may include the hierarchical subtype "PhysicalAddress" 510 and a parent list including representations of the data types "Address" 506 and "Person" 502. A third example entry in the modeler row may include the hierarchical subtype "Name" 508 and a parent list including representations of the data types "Address" 506 and "Person" 502. A fourth example entry in the modeler row may include the hierarchical subtype "Address" 506 and a parent list including a representation of the data type "Person" 502. The modeler row may then be used as input to the consolidation engine 106 for generating consolidation groups as discussed previously.

Figure 6:
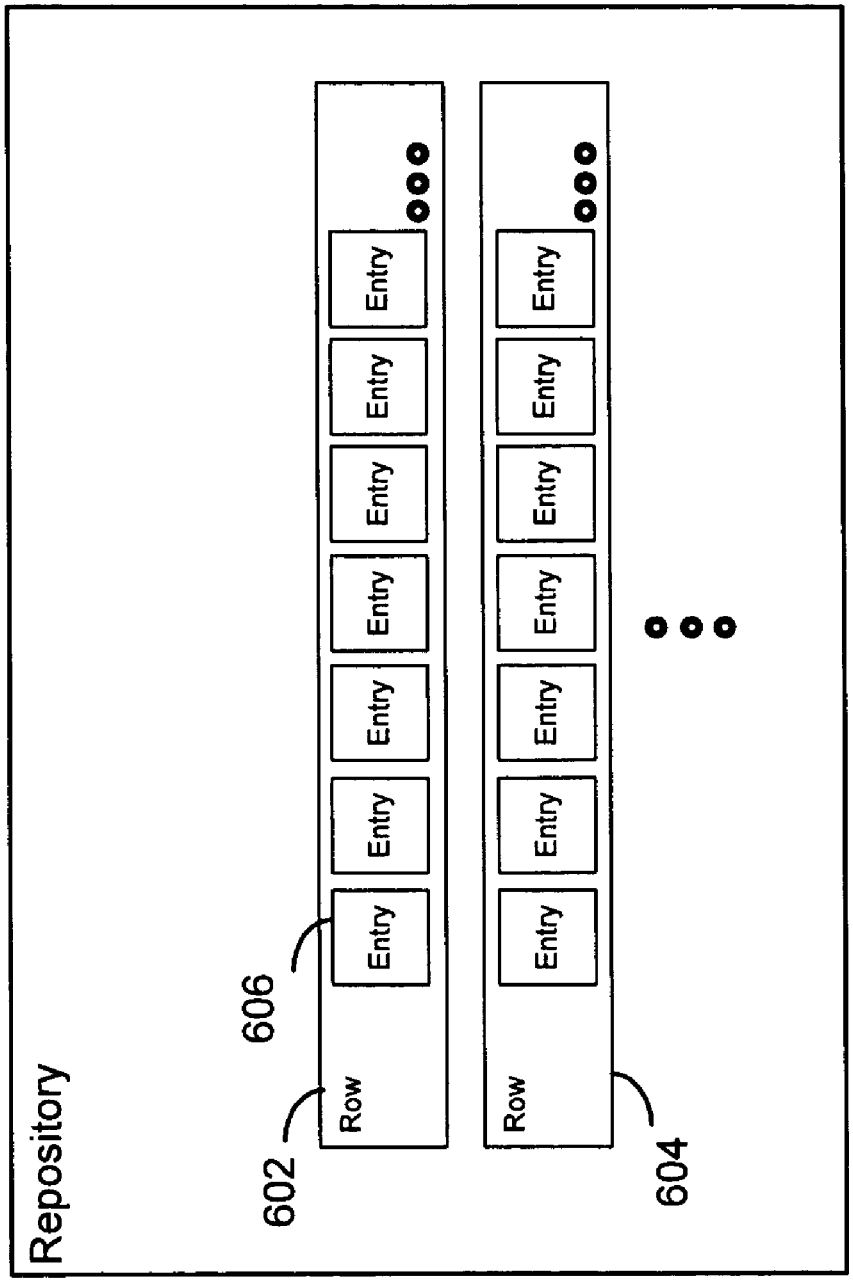
FIG. 6 depicts an example repository including example rows according to an example embodiment.

FIG. 6 depicts an example repository 600 including example rows according to an example embodiment. For example, the example consolidation repository storage area 112 may include the repository 600. The repository 600 may include repository rows 602, 604 which may include entries 606 which may, for example, be generated by the consolidation engine 106 as discussed further below.

Figure 7:
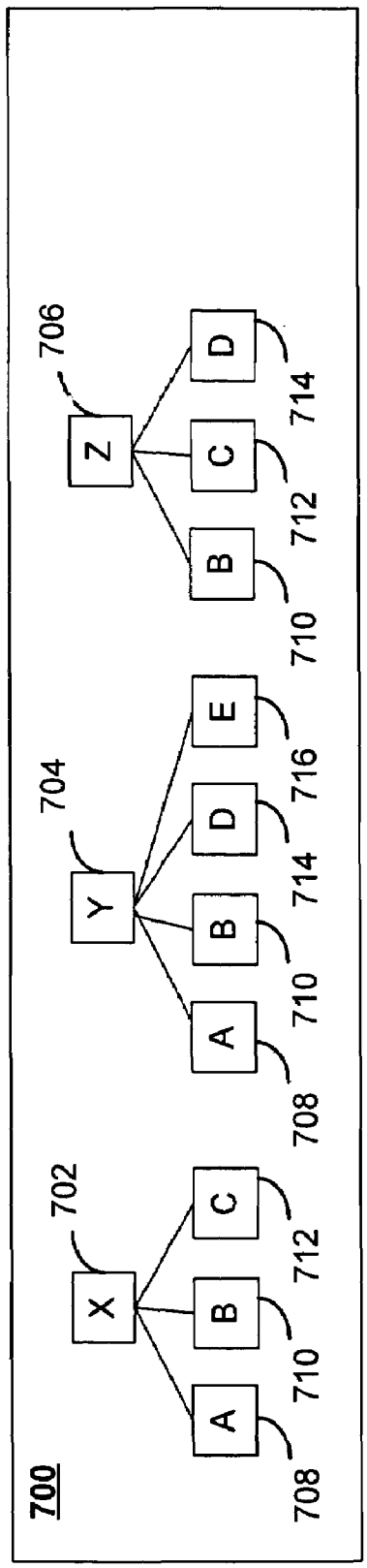
FIG. 7 depicts an example hierarchical representation of data types according to an example embodiment.

FIG. 7 depicts an example hierarchical representation 700 of data types according to an example embodiment. For example, the data types shown in FIG. 7 may correspond to XML data types that may be included in the data type repository 110 as discussed previously. As shown in FIG. 7, data type indicators X 702, Y 704, and Z 706 may include direct subelements or direct hierarchical subtypes. For example, the data type indicator X 702 may include hierarchical subtypes A 708, B 710, and C 712. Thus, the hierarchical subtypes A 708, B 710, and C 712 may be associated with a parent data type indicator X 702. The data type indicator Y 704 may include hierarchical subtypes A 708, B 710, D 714, and E 716. Thus, the hierarchical subtypes A 708, B 710, D 714, and E 716 may be associated with a parent data type indicator Y 704. The data type indicator Z 706 may include hierarchical subtypes B 710, C 712, and D 714. Thus, the hierarchical subtypes B 710, C 712, and D 714 may be associated with a parent data type indicator Z 706.

Figure 8:
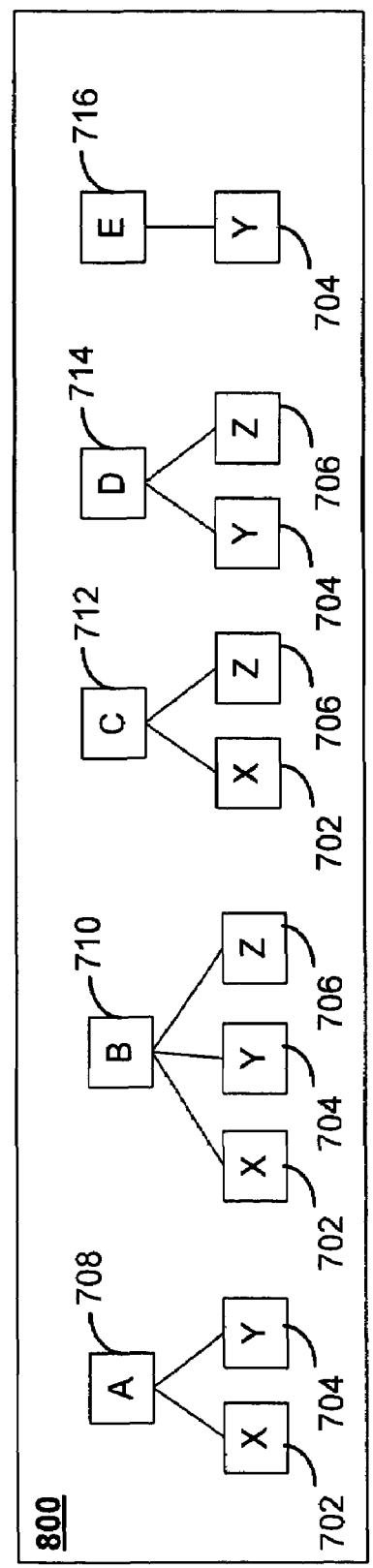
FIG. 8 depicts an example hierarchical representation of data types after conversion to a repository format according to an example embodiment.

FIG. 8 depicts an example hierarchical representation 800 of data types after conversion to a repository format according to an example embodiment. Thus, the hierarchical representation 800 may depict an example row such as a modeler row included in the consolidation repository storage area 112, similarly to the row 602 of the repository 600 discussed previously. The hierarchical representation 800 may thus be generated by the model row generator 108 based on the hierarchical representation 700 of data types stored in the data type repository 110. Therefore, as shown in FIG. 8, the first hierarchical structure depicted as including a root A 708 may represent a first entry in a first row, or modeler row, in the consolidation repository storage area 112.

In an example conversion of the example hierarchical representation 700 of data types included in the data type repository 110 to the modeler row of FIG. 8, the first hierarchical structure of the example hierarchical representation 700, which includes the parent data type indicator X 702, is traversed to obtain the first child, or hierarchical subtype A 708 of the data type indicator X 702. The hierarchical subtype A 708 may then be included as a parent of a first entry included in a first row in the consolidation repository storage area 112. The parent data type indicator X 702 of the hierarchical subtype A 708 from the data type repository 110 may be included as a child of the hierarchical subtype A 708 in the consolidation repository storage area 112, and thus may be included in a parent list associated with the hierarchical subtype A 708. It may also be determined that the hierarchical subtype A 708 is included as a child, or descendent, of other parents, or data types, included in the data type repository 110. For example, as shown in FIG. 7, the hierarchical subtype A 708 is shown as a child of the data type indicator Y 704. Thus, the data type indicator Y 704 may be added to the parent list associated with the hierarchical subtype A 708 in the modeler row as shown in FIG. 8.

Similarly, the model row generator 108 may determine that the hierarchical subtype B 710, as shown in FIG. 7, may be included as a child of the data type indicator X 702. The hierarchical subtype B 710 may then be included as a parent of a second entry included in the first row in the consolidation repository storage area 112. It may then be determined that the hierarchical subtype B 710 is included as a child of the data type indicators X 702, Y 704, and Z 706 in the data type repository 110, and thus each of the data type indicators X 702, Y 704, and Z 706 may be included in a parent list associated with the hierarchical subtype B 710 stored as a second entry in the modeler row in the consolidation repository storage area 112, as shown in FIG. 8.

Further, the hierarchical subtype C 712 may be determined to be included as a child of the data type indicators X 702 and Z 706 in the data type repository 110. The hierarchical subtype C 712 may then be included as a parent of a third entry included in the first row in the consolidation repository storage area 112, and may be associated with a parent list including the data type indicators X 702 and Z 706, as shown in FIG. 8.

Similarly, the hierarchical subtype D 714 may be determined to be included as a child of the data type indicators Y 704 and Z 706 in the data type repository 110, and the hierarchical subtype E 716 may be determined to be included as a child of the data type indicator Y 704 in the data type repository 110. The hierarchical subtype D 714 and the hierarchical subtype E 716 may then be included as parents of fourth and fifth entries included in the first row in the consolidation repository storage area 112. The hierarchical subtype D 714 and the hierarchical subtype E 716 may be associated with respective parent lists including data type indicators Y 704 and Z 706, and data type indicator Y 704, respectively, as shown in FIG. 8. The example modeler row as shown in FIG. 8 may then be used as input for processing by the consolidation engine 106, for example, for generation of consolidation groups.

An example Algorithm 1 as shown below illustrates example steps that may be performed by an example consolidation engine 106 generally to fill the rows of the repository, for example, the consolidation repository storage area 112.

---

Algorithm 1: Repository row generation

```
Data: repository with one row filled by modeler
Result: completely calculated repository
repeat
    refEntry = getReferenceEntry(repository);
    row = getRow(refEntry);
    if row == maxRow then
        fillRow = new Row;
    end
    else
        fillRow = next row after row;
    end
    foreach entry in row do
        if !entry.isCombined then
            newEntry = combine(refEntry, entry);
            fillRow.add(newEntry);
        end
    end
    organize( );
until all entries combined;
```
---

The example Algorithm 1 generally may provide information regarding data types that may have common subtypes or sub data types in the original data file, for example, the in data type repository 110. Thus, Algorithm 1 generally may cumulatively generate more repository rows, for example, for the consolidation repository storage area 112. Each row of the repository may include a "combination" of each of the entries in the row directly before the current row with each of the entries of the first row (getRow(refEntry)=modelerRow). "Combination" in this context may refer to generating a new entry based on merging the subtypes or sub data types of two entries and intersecting the parents of these two entries. The complete combination of one "reference entry" with every other entry of the first row may be referred to herein as a "round." After a round, the reference entry may be referred to herein as an already "combined entry." Two example heuristics, a top-down selection heuristic and a ranking heuristic, may be used in determining the reference entry for every round, as discussed below.

Algorithm 2 as shown below illustrates an example top-down technique for selecting the reference entry in every round.

---
Algorithm 2: Top-down example for getReferenceEntry( )

```
Data: repository
Result: referenceEntry
foreach row in repository downto modeler row do
    if uncombined entries in row > 1 then
        return first uncombined entry in row
    end
end
return null
```
---

According to an example embodiment, the entries of every row may be sorted by each entry's number of parents in ascending order. When two entries have the same number of parents, they, for example, may be sorted alphabetically. In every round, the example consolidation engine 106 may iterate through the rows beginning from the top. When the example consolidation engine 106 detects a row that includes at least two entries that have not yet been combined, the example consolidation engine 106 may combine the first of these entries with the first row, or the modeler row. After each round, the example consolidation engine 106 may sort the entries of every row into ascending order based on the number of their parents, for example, as shown below in Algorithm 3.

---
Algorithm 3: Top-down example of organize( )

```
Data: repository
Result: sorted repository
foreach row in repository do
    sort entries in row by number of parents;
end
```
---

One skilled in the art of data processing will appreciate that the example sorting may also be provided by other techniques, for example, by sorting into descending order. Such sorting techniques may be performed, for example, by the sorting engine 118 discussed previously. Algorithm 2 may complete processing when the reference entry is to be selected from the modeler row, and the modeler row does not contain any more entries that have not yet been combined.

Another example technique for selecting a next reference entry may include a ranking technique as illustrated below in Algorithm 4.

---
Algorithm 4: Top-down example of getReferenceEntry( )

```
Data: entryList
Result: referenceEntry
foreach entry in entryList downto 0 do
    if !entry.isCombined( ) then
        row = entry.getRow( );
        if uncombined entries in row > 1 then
            return entry
    end
```

---
-continued

Algorithm 4: Top-down example of getReferenceEntry( )

```
    end
end
return null
```
---

After each round, a rank of each new entry may be calculated based on an example scaled (scale), weighted ($w_{pp}$, $w_{cs}$, $w_{cc}$) sum as shown in Equation (1):

$$\text{rank} = \frac{\text{scale}}{w_{pp} + w_{cs} + w_{cc}} \left( w_{pp} \frac{\sqrt{p}}{\sqrt{P}} + w_{cs} \frac{c}{S} + w_{cc} \frac{\sqrt{c}}{\sqrt{C}} \right), \quad (1)$$

wherein scale indicates a scale value, $w_{pp}$, $w_{cs}$, $w_{cc}$ indicate weight values, p indicates a number of parents associated with the new entry, P indicates a maximum number of parents of all entries included in a repository, c indicates a number of shared subtype indicators, S indicates a mean number of subtype indicators associated with all parents of the repository, and C indicates the maximum number of shared subtype indicators of all entries included in the repository.

Intuitively, for example, $$\frac{p}{P}$$

may provide prioritization for large consolidation groups, $$\frac{c}{S}$$

may provide precedence for groups having data types that include mostly core data types, and $$\frac{c}{C}$$

may provide prioritization to large cores generally. The rank calculation may not include entries of the modeler row. Results discussed below refer to results from example test runs, based on example data type files and example weights $w_{pp}=1$, $w_{cs}=1$, and $w_{cc}=4$ which were applied, for example, in order to explore large common cores early in processing.

According to an example embodiment, if one of the new entries' number of parents is larger than the maximum number of parents of all entries (P) or if the number of the shared subtypes or sub data types is larger than the maximum number of shared subtypes or sub data types of all entries (C), the ranking for all entries may be newly calculated, for example, based on an example ranking technique as illustrated by Algorithm 5 as follows:

| Algorithm 5: Ranking implementation of organize( ) |
|---|
| Data: entryList<br>Result: sorted entryList<br>calculateRanking(newEntries);<br>entryList.add(newEntries);<br>if calculationReferenceValues changed then<br>    recalculateRanking(entryList);<br>end |

The example ranking technique may be performed, for example, by the ranking engine 120 discussed previously. In addition to the repository, all entries may be stored in an example separate list. The example separate list may be sorted by the rank of the entries, for example, in ascending order. In every round, the consolidation engine 106 may select as the new reference entry the highest entry that is not yet marked or flagged as combined. The example Algorithm 5 may terminate, for example, when if the consolidation engine 106 has iterated through the whole list without finding any entries to combine.

According to an example embodiment, an example optimization technique may include the use of a flag that indicates whether an entry has already been combined. Thus, a flag may be set for each entry of a row when it is combined with every other row entry so that the entry may not be further combined.

The example Algorithm 1 discussed previously may combine every element of every row with every element of the first row, which may require a significant amount of calculation. According to an example embodiment, an example enhanced technique may combine only elements of the same row. Thus, the getRow call included in Algorithm shown above may provide an inner-row combination by including getRow (refEntry)=refEntry.getRow( ). The enhancement generally loses no information and may process the information in less time than without the enhancement.

According to an example embodiment, an early deletion of elements optimization technique may be provided based on an early deletion of elements that are completely contained in a combination. In accordance with the example technique, after combining one entry of a row with every other entry in the same row, every old entry that is contained in a new entry may be deleted. In other words, every old entry having all subtypes or sub data types and all parents that are also included in another entry may be deleted. Such a deletion operation may be performed, for example, by the deletion engine 122.

According to an example embodiment, an example minimization optimization technique may be performed, for example, by the minimization engine 124. After the example model row generator 108 completes modeling operations, and at the conclusion of each round of the consolidation engine 106, all entries of the repository that include only one parent may be deleted. The example minimization optimization technique is effective based on the concept of similarity in the context of consolidation of data types, as for parents to be similar in this context, at least two parents need to share common subtypes or sub data types. Thus, an entry that includes only one parent may indicate that the parent is not similar to another parent with regard to the entry's subtype.

According to an example embodiment, an example parent combination optimization technique may be performed. This example optimization technique is based on an assumption that combination of two elements is performed with a high frequency, for example, by the consolidation engine 106. In accordance with the example optimization technique, the combination of parents may be optimized based on using the same object for every occurrence of a specific parent in an example combination operation. Thus, marking the parents of the reference entry also marks the parents in the entry to be combined with the reference entry. The intersection of the parents may then be determined as the set of marked parents of the entry to be combined with the reference entry. Thus, the calculation of the intersection of the parent sets may advantageously be performed more efficiently.

According to an example embodiment, performance of example consolidation techniques discussed herein may be advantageously enhanced based on a combination of the optimization techniques discussed previously.

Figure 9:
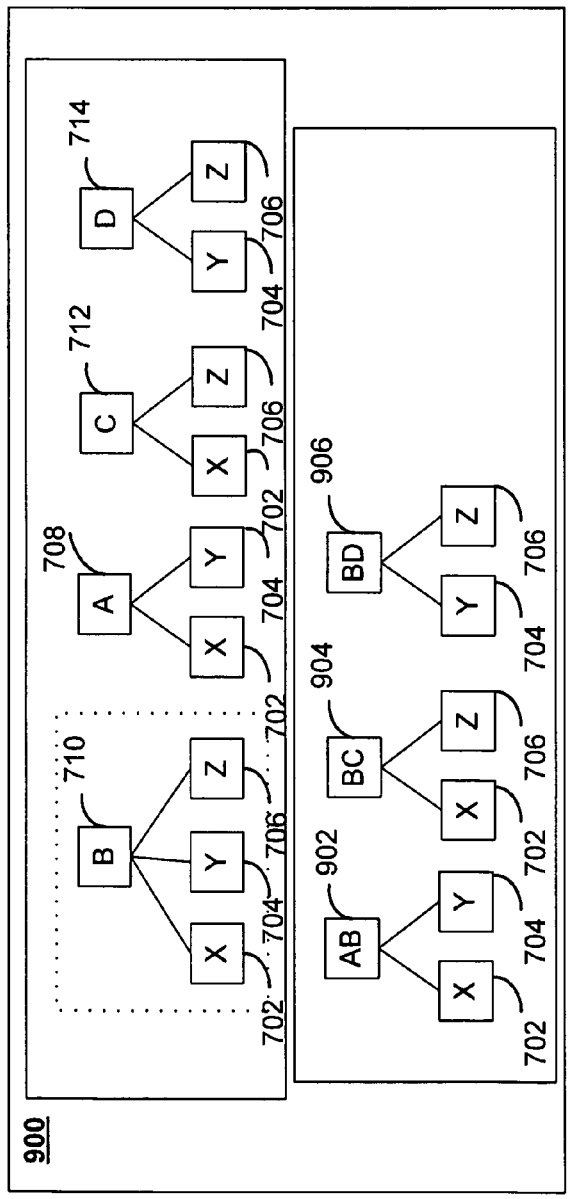
FIGS. 9-12 depict example representations of row entries in an intermediate form during an example consolidation processing according to an example embodiment.

Based on example consolidation techniques discussed herein, FIGS. 9-12 depict example representations of row entries in an intermediate form during an example consolidation processing according to an example embodiment. For example, FIG. 9 depicts two rows of the consolidation repository after initial processing, for example, by the consolidation engine 106 of the modeler row 800 shown in FIG. 8. For example, the entries in the row of FIG. 8 may be sorted based on the number of parents for each entry, resulting in a placement of the entry for the subtype indicator B 710 at the beginning of the first row of the consolidation repository. The sorting may be performed, for example, by the sorting engine 118 as discussed previously. Further, the entry for the subtype indicator E 716 may be eliminated from the first row, for example, by the minimization engine 124, as the entry includes only one parent in its parent list, and thus may indicate no similarity with other hierarchical subtypes.

The entry for the subtype indicator B 710 may be combined with the entry for the subtype indicator A 708 by combining the subtype indicators to generate a consolidation group AB 902, for example, by the consolidation group generator 114 as discussed previously. The parent lists of B 710 and A 708 may be intersected, for example, by the comparison engine 116, to generate a parent list including X 702 and Y 704, for a combined parent list associated with the consolidation group AB 902. A new entry for the consolidation group AB 902 may be added in a new row as shown in FIG. 9.

Similarly, the entry for the subtype indicator B 710 may be combined with the entries for the subtype indicators C 712 and D 714 individually to generate new entries for a new consolidation group BC 904 including a parent list of parents X 702 and Z 706, and a new consolidation group BD 906 including a parent list of parents X 702 and Z 706.

Figure 10:
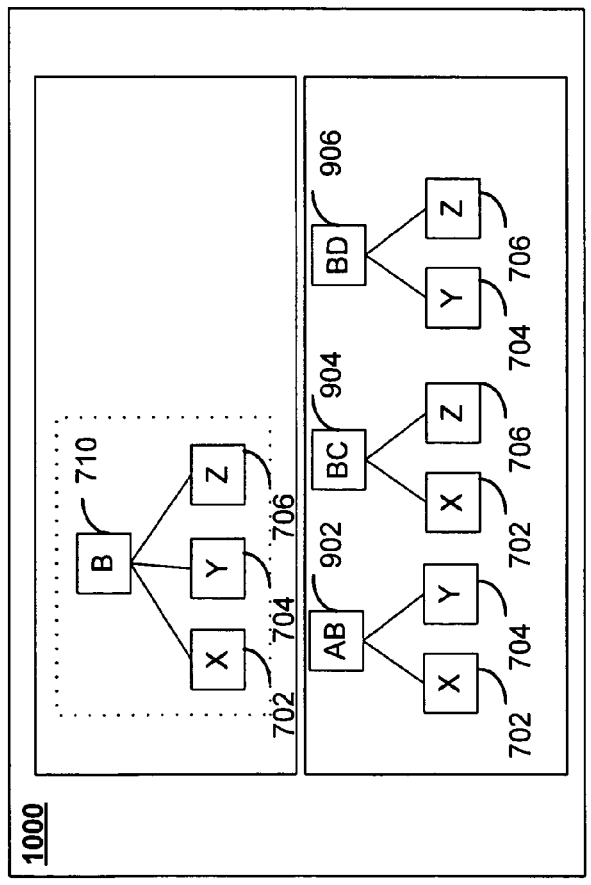

FIG. 10 depicts an example state of the consolidation repository after an optimization of the consolidation repository rows shown in FIG. 9. For example, the entries of the first row including the hierarchical subtypes A 708, C 712, and D 714 may be deleted, for example, by the deletion engine 122, as each of these entries is contained in new entries AB 902, BC 904, or BD 906, respectively, and may thus be deleted, as discussed previously. FIG. 10 thus illustrates the state of the consolidation repository entries after the completion of a round, and thus the results may be presented to a user, for example, via the GUI engine 126 and the user interface 104 as discussed previously.

Figure 11:
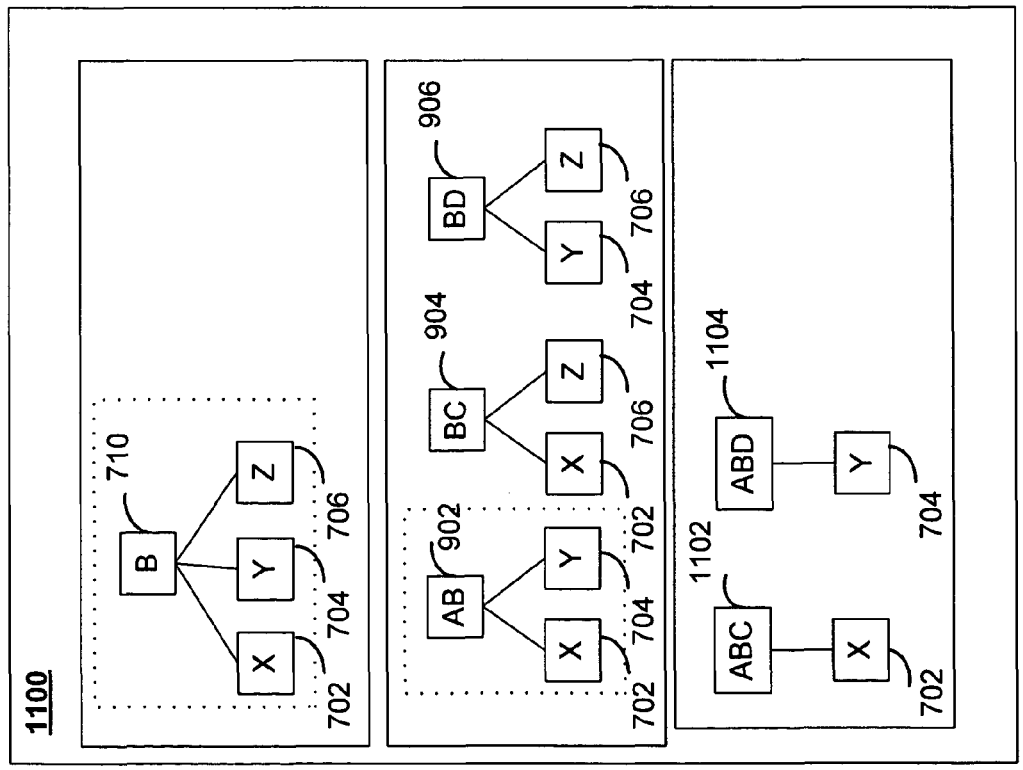

FIG. 11 illustrates an example result of combining the entry for AB 902 with the entries for BC 904 and BD 906, respectively. Thus, the example consolidation group generator 114 may combine the consolidation group 902 with the consolidation groups 904 and 906 respectively to generate new consolidation groups ABC 1102 and ABD 1104, respectively. Further, the example comparison engine 116 may intersect the parent lists associated with BC 904 and BD 906 to generate a parent list including X 702 for ABC 1102, and a parent list Y 704 for ABD 1102. Each of these new entries may be stored in a new row of the repository, as shown in FIG. 11. However, as each of the new entries for ABC 1102 and ABD 1104 include only one parent in their respective parent lists, the example minimization engine 124 may delete each of the entries for ABC 1102 and ABD 1104 as discussed previously.

Figure 12:
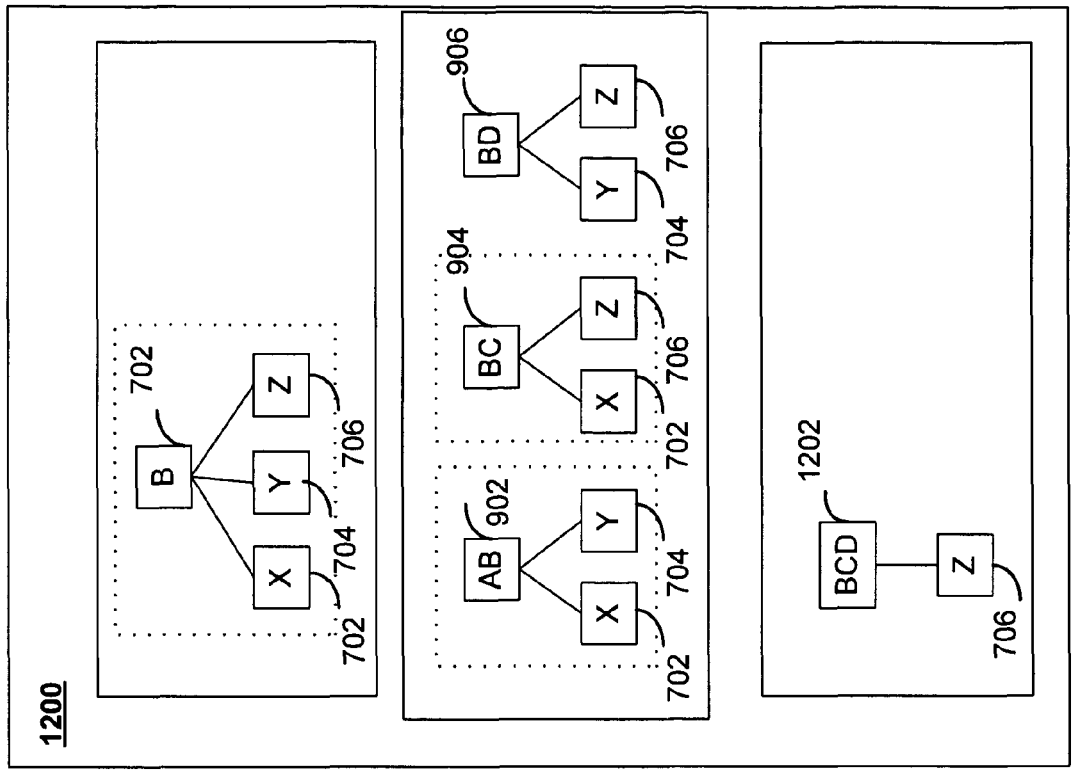

FIG. 12 illustrates an example result of combining the entry for BC 904 with the entry for BD 906. As BC 904 has already been combined with AB 902, there is no need to duplicate the processing, and thus an optimization may flag AB 902 as having been already combined with all entries in the repository (e.g., as shown by the dotted line box enclosing the entry for AB 902, and for the entry B 702). The example consolidation group generator 114 may combine the consolidation group BC 904 with the consolidation group BD 906 to generate a new consolidation group BCD 1202. The example comparison engine 116 may intersect the parent list associated with BC 904 that includes X 702 and Z 706 with the parent list associated with BD 906 to generate a new parent list including Z 706 to be associated with the new entry BCD 1202 for storage in a new row of the repository as shown in FIG. 12. However, as the new entry for BCD 1202 includes only one parent in its parent list, the minimization engine 124 may delete the entry for BCD 1202 as discussed previously.

Figure 13:
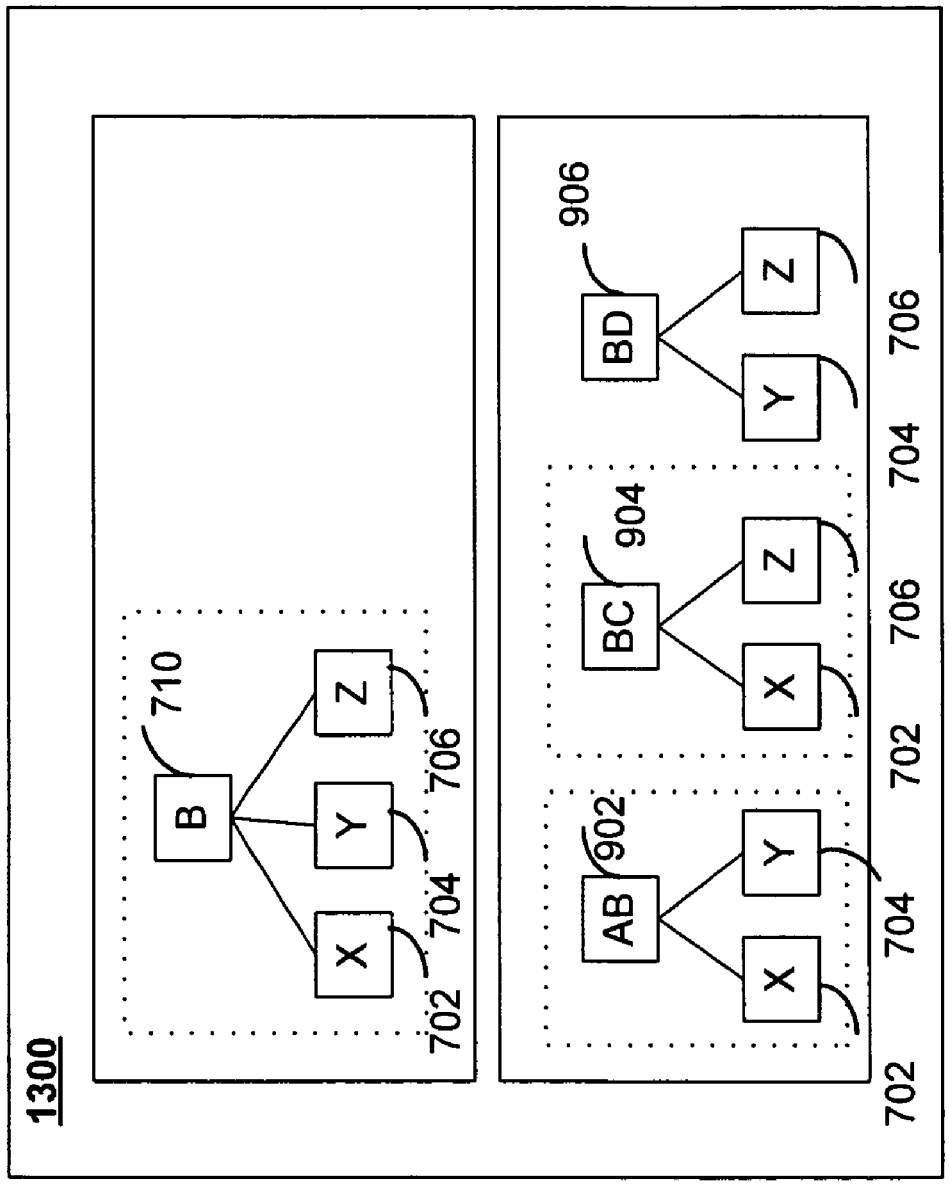
FIG. 13 depicts an example representation of row entries representing consolidation groups of an example consolidation processing according to an example embodiment.

FIG. 13 depicts an example representation of row entries representing consolidation groups of an example consolidation processing according to an example embodiment. More particularly, FIG. 13 illustrates an example state of the repository after completing the processing of the entries shown in FIG. 12 discussed above. Since all entries have been combined with all other entries, FIG. 13 illustrates the final result of the final round of consolidation. The GUI engine 126 and user interface 104 may display the result to the user, who may, for example, generate a new user-defined data type based on the consolidation groups included in the repository.

Figure 14:
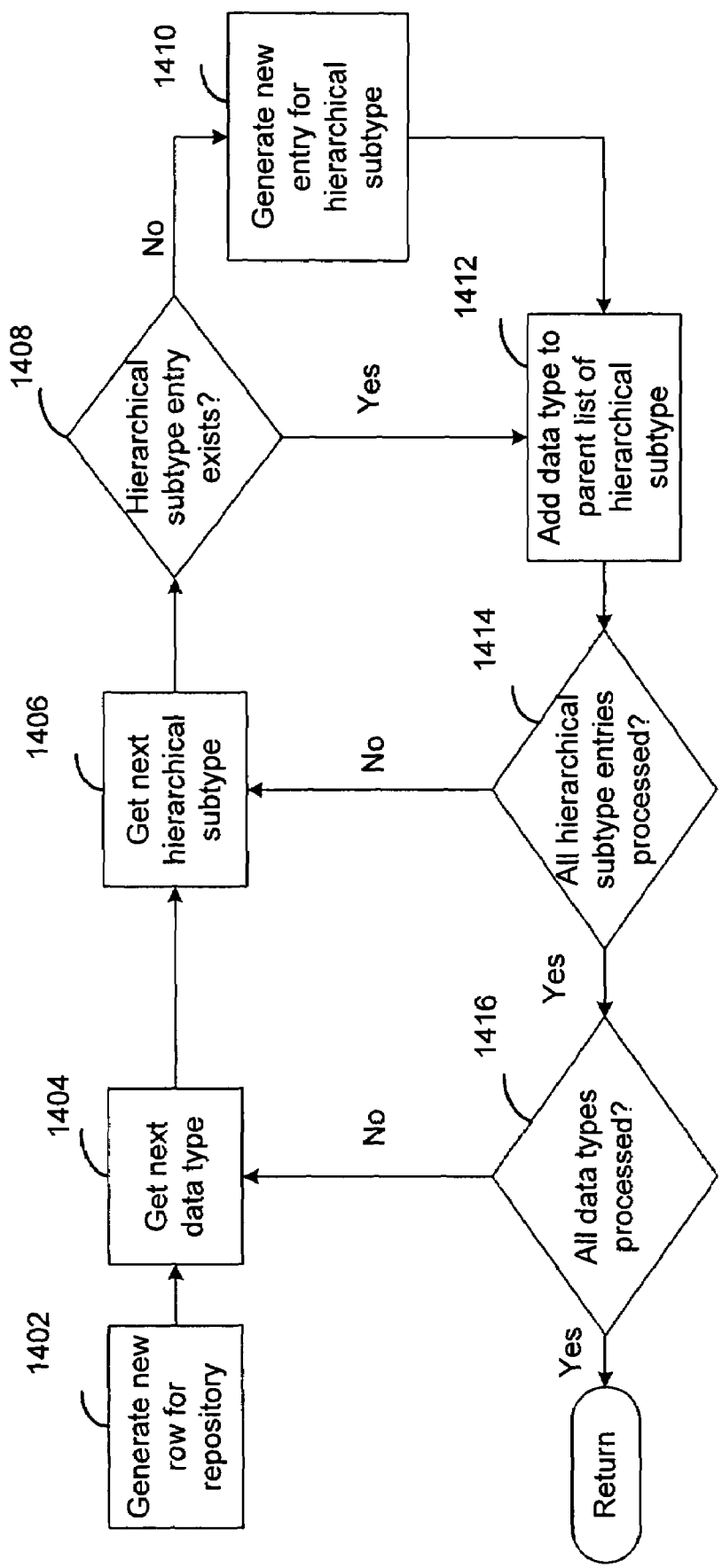
FIG. 14 is a flowchart illustrating an operation of the example system of FIG. 1.

FIG. 14 is a flowchart illustrating an operation of the example system of FIG. 1 according to an example embodiment. More particularly, FIG. 14 is a flowchart illustrating operation of an example model row generator 108 for generating a modeler row for an example repository, for example, a repository included in the example consolidation repository storage area 112. At 1402, a new row may be generated for the repository. For example, the model row generator 108 may initialize a new row for the repository which will include row entries as discussed previously. At 1404, a next data type may be obtained. For example, the model row generator 108 may get a next data type from the original data types, which may be stored in the data type repository 110. For example, the data type may include an XML data type, as discussed previously. For example, the data type X 702 may be obtained, as discussed previously with regard to FIG. 7.

At 1406, a next hierarchical subtype may be obtained. For example, the model row generator 108 may obtain a next hierarchical subtype corresponding to the current data type, for example, from the data type repository 110 as discussed previously. For example, the hierarchical subtype A 708 may be obtained as discussed previously with regard to FIG. 7. At 1408, the model row generator 108 may determine whether an entry already exists in the repository for the hierarchical subtype obtained at 1406. If such an entry does not already exist, then at 1410, a new entry for the hierarchical subtype may be generated, for example, by the model row generator 108. For example, the new entry for A 708 as discussed previously with regard to FIG. 8 may be generated, and may be added to the repository.

At 1412 the data type may be added to the parent list of the hierarchical subtype. For example, the model row generator 108 may add the data type X 702 to the parent list of the hierarchical subtype A 708 as discussed previously with regard to FIG. 8. At 1414, it may be determined whether all hierarchical subtype entries have been processed. For example, if the model row generator 108 determines that not all hierarchical subtype entries have been processed, then control may pass to 1406 to continue processing the next hierarchical subtype. If it is instead determined that all hierarchical subtype entries have been processed, then at 1416, a determination may be made whether all data types have been processed. For example, if the model row generator 108 determines that not all data types have been processed, then control may pass to 1404 to continue processing the next data type. If it is instead determined that all data types have been processed, then control may be passed to the calling routine.

Figure 15:
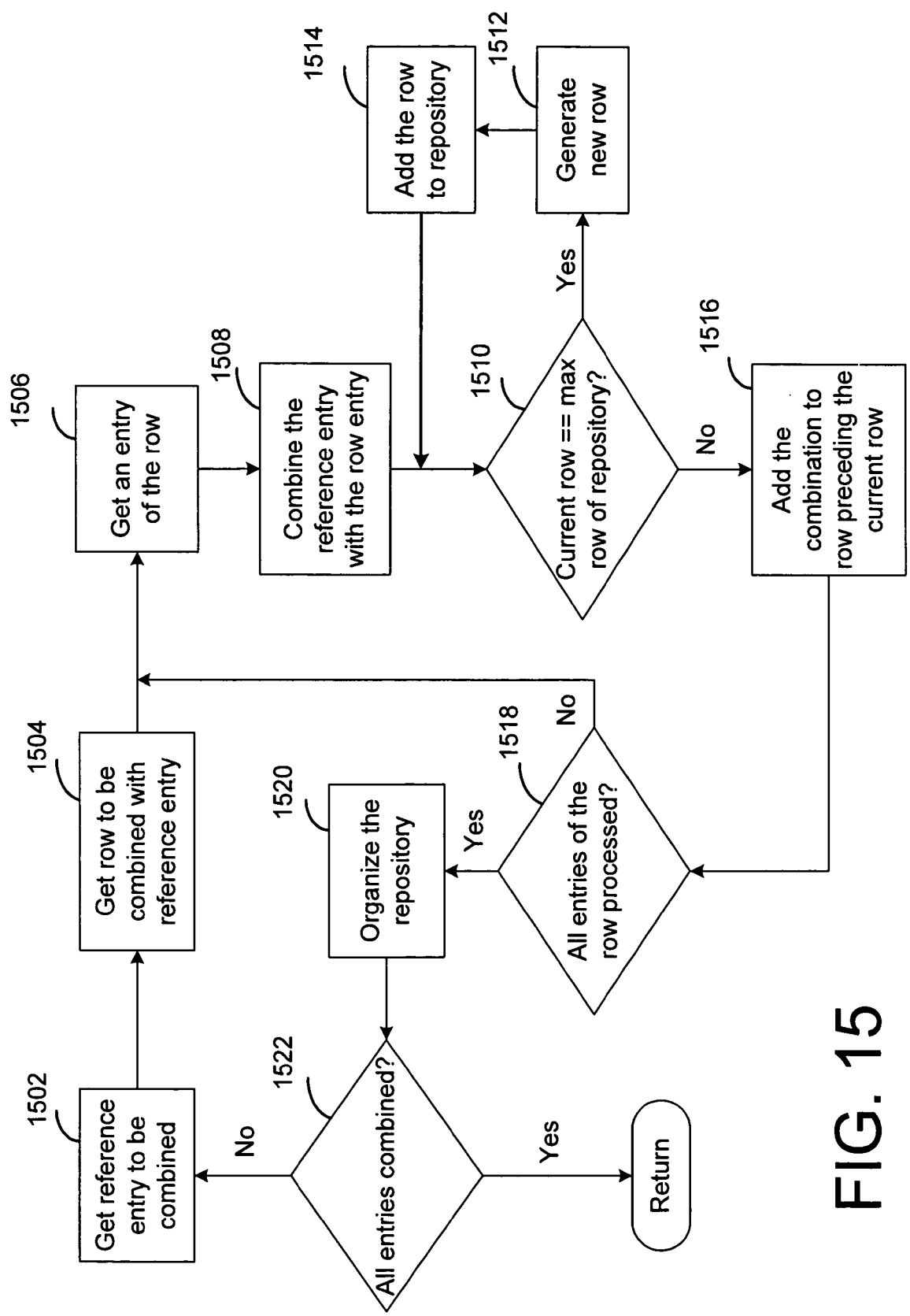
FIG. 15 is a flowchart illustrating an operation of the example system of FIG. 1.

FIG. 15 is a flowchart illustrating an operation of the example system of FIG. 1. More particularly, FIG. 15 is a flowchart illustrating operation of an example consolidation engine 106 for generating a consolidation groups for an example repository, for example, a repository included in the example consolidation repository storage area 112. At 1502, a reference entry to be combined may be obtained, for example, from the consolidation repository storage area 112 as discussed previously. At 1504, a row to be combined with the reference entry may be obtained, for example, by the consolidation engine 106 from the consolidation repository storage area 112 as discussed previously. At 1506, an entry of the row may be obtained, and at 1508 the reference entry may be combined with the row entry as discussed previously.

At 1510 it may be determined whether the current row is the maximal row of the repository. If it is determined that the current row is the maximal row of the repository, then at 1512 a new row may be generated, and at 1514 the row may be added to the repository. If it is instead determined that the current row is not the maximal row of the repository, then at 1516, the combination may be added to the row preceding the current row in the repository as discussed previously.

At 1518 it may be determined whether all entries of the row have been processed. If it is determined that all entries of the row have not been processed, control may pass to 1506 to continue processing of entries of the row. If it is instead determined all entries of the row have been processed, then at 1520, the repository may be organized, for example, by sorting entries and performing example optimizations.

At 1522 it may be determined whether all entries of the repository have been combined. If it is determined that not all entries of the repository have been combined, then control may pass to 1502 to continue processing of entries of the repository. If it is instead determined that all entries of the repository have been combined, then control may be passed to the calling routine.

Figure 16:
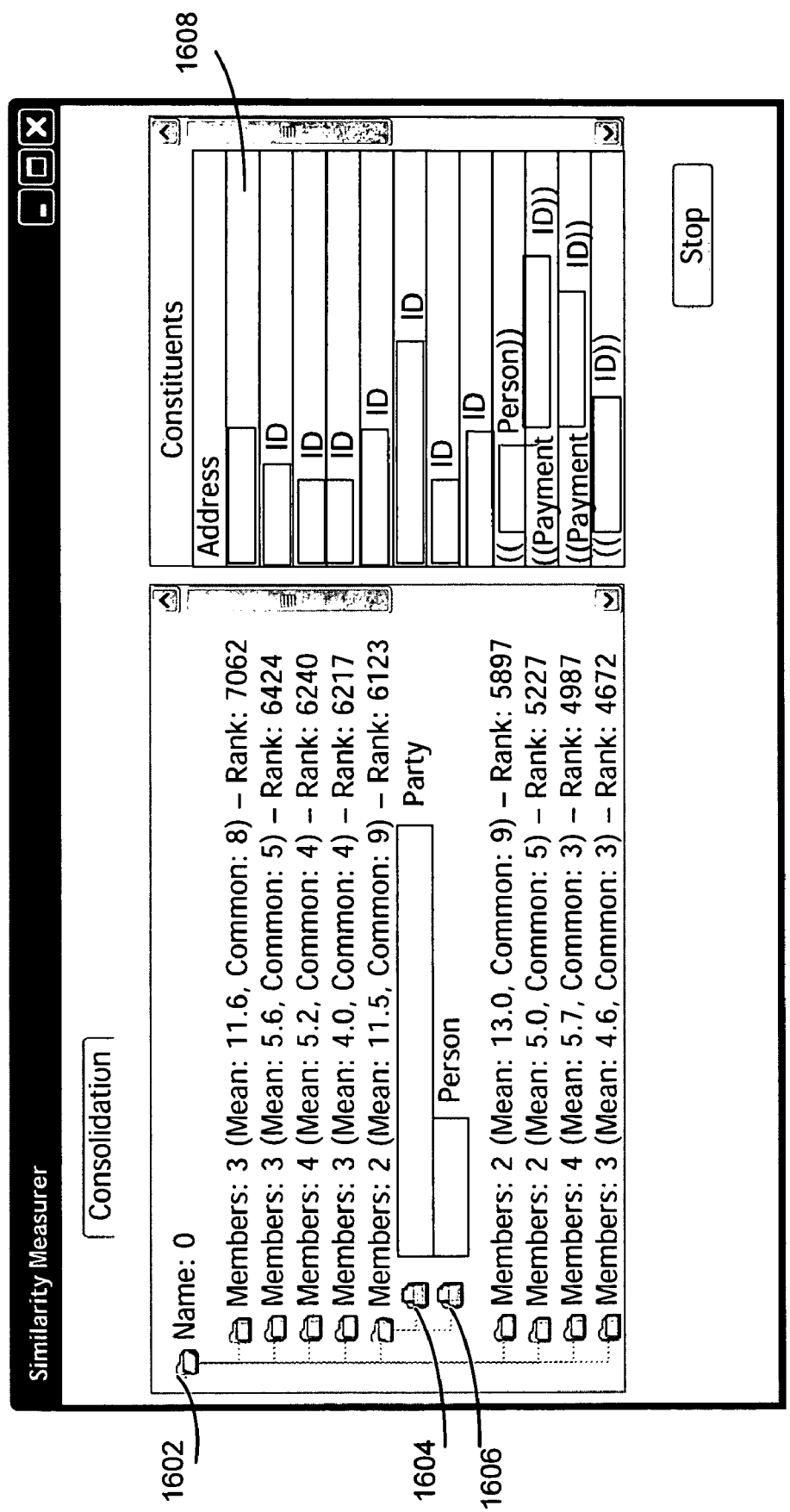
FIG. 16 depicts an example user interface screen shot according to an example embodiment.

FIG. 16 depicts an example user interface screen shot 1600 according to an example embodiment. For example, the GUI engine 126 may map the entries of the consolidation repository, for example, the consolidation repository storage area 112, back on the original XML data types, for example, included in the data type repository 110. This mapping may be performed, for example, based on a list of the original data types with their children. The GUI engine 126 may map the consolidation repository each n rounds and may send the results to the user interface 104 for presentation to the user. According to an example embodiment, the results may be ranked and/or ranked by the GUI engine 126. The entries of the first row of the consolidation repository may be ignored by the GUI engine 126, because they may be irrelevant with regard to presentation of consolidation results. According to an example embodiment, the GUI engine 126 may send results to the user interface 104 after every nth round, for example, after every 20$^{th}$ round. Based on the example design of the consolidation engine 106, the most promising entries may advantageously be calculated first, as the probability may be high that the best matches may be determined early and quickly.

According to an example embodiment, the entries of the consolidation repository may be sorted by size, for example, by the GUI engine 126. Thus, the entries may be sorted by the number of the shared subtypes or sub data types in ascending order. All entries having a same number of subtypes or sub data types may be sorted based on the number of parents associated with each entry.

According to an example embodiment, the entries of the consolidation repository may be ranked, for example, by the GUI engine 126. For example, the GUI engine 126 may rank the entries based on the ranking techniques discussed previously. In the example screen shot 1600 of FIG. 16, the left hand side of the screen shot provides a list of consolidation groups found by the consolidation engine 106. As shown in FIG. 16, a data type "Name" 1602 includes multiple subtypes listed as subtrees on the display 1600. As shown in FIG. 16, the group's labels include the following information: The number of contained elements, their mean size, the size of the common core, and the rank. As shown in FIG. 16, a data type is selected that includes two contained elements, shown as a party element 1604 and a person element 1606.

In the example screen shot 1600 of FIG. 16, the right hand side 1608 of the screen shot provides a display of the subtypes or sub data types of the selected data type included in the right hand side. As shown in FIG. 6, elements shown in double parenthesis "(( . . . ))" may be understood as not included in the common core. A user may thus determine consolidation groups from a few early iterations of the consolidation engine 106 and may, for example, determine a user-defined data type, for example, to minimize storage of data types in large repositories.

Thus, example efficient, iterative consolidation techniques may be provided that utilize example heuristics to provide relevant results early. As shown in FIG. 16, the results may be provided via a non-redundant, ranked list of consolidation groups.

The example techniques discussed herein may be used, for example, to process large repositories from industrial environments. Besides structuring large XML schema repositories, the example techniques discussed herein may be used for the retrieval of similar repository types as well. For example, an important task in software engineering includes finding data types that a developer may extend or restrict in order to implement a new functionality. Thus, the example techniques described herein may, for example, process a sample description of a requested data type and generate similar types with respect to a large overlap of contained elements based on the example precomputed structured repositories discussed herein.

Further, the techniques discussed herein may, for example, support the reuse of Web services (WS) and the consolidation of large WS repositories based on the data types communicated by the WS.

The example techniques discussed herein may also be used for data types that may include subtypes at deeper structural layers than direct child subtypes of XML data types, as well as data types that may include subtypes that may be represented by more complex tree structures.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system comprising:
a processor;
a model row generator that is operably coupled to the processor and that is configured to cause the processor to:
obtain a plurality of data type indicators of data types, wherein each data type indicator is associated with one or more hierarchical subtypes of the data type,
generate a first subtype indicator of a first hierarchical subtype associated with a first one of the plurality of data type indicators in a first hierarchical subtype relationship,
generate a first parent list including one or more representations of one or more of the plurality of data types associated with the first hierarchical subtype, wherein the first parent list includes a representation of the first one of the plurality of data types,
generate a second subtype indicator of a second hierarchical subtype associated with a second one of the plurality of data type indicators in a second hierarchical subtype relationship, and
generate a second parent list including one or more representations of one or more of the plurality of data types associated with the second hierarchical subtype, wherein the second parent list includes a representation of the second one of the plurality of data types; and
a consolidation engine that is operably coupled to the processor and that is configured to cause the processor to generate a first consolidation group based on combining the first subtype indicator with the second subtype indicator and comparing the first parent list with the second parent list, wherein the consolidation engine is further configured to select the first subtype indicator based on a ranking selection.

2. The system of claim 1 wherein the data types include eXtensible Markup Language (XML) data types.

3. The system of claim 1 wherein the one or more hierarchical subtypes of the each data type include one or more sub elements of the each data type represented as a data type element.

4. The system of claim 1 wherein the consolidation engine includes a consolidation group generator configured to generate the first consolidation group based on combining the first subtype indicator with the second subtype indicator and comparing the first parent list with the second parent list.

5. The system of claim 1 wherein the consolidation engine includes a comparison engine configured to generate a combined parent list based on intersecting the first parent list with the second parent list.

6. The system of claim 1 wherein the consolidation engine includes a deletion engine configured to delete a redundant consolidation group wherein the redundant consolidation group includes a common set of subtype indicators with the first consolidation group and a parent list associated with the redundant consolidation list includes a subset of elements of the first parent list.

7. The system of claim 1 wherein the consolidation engine includes a minimization engine configured to delete one or more consolidation groups each having an associated parent list that includes only one parent in associated parent list.

8. A method comprising:
obtaining a plurality of data type indicators of data types, wherein each data type indicator is associated with one or more hierarchical subtypes of the data type;
generating by a processor a first subtype indicator of a first hierarchical subtype associated with a first one of the plurality of data type indicators in a first hierarchical subtype relationship;
generating by the processor a first parent list including one or more representations of one or more of the plurality of data types associated with the first hierarchical subtype, wherein the first parent list includes a representation of the first one of the plurality of data types;
generating by the processor a second subtype indicator of a second hierarchical subtype associated with a second one of the plurality of data type indicators in a second hierarchical subtype relationship;
generating by the processor a second parent list including one or more representations of one or more of the plurality of data types associated with the second hierarchical subtype, wherein the second parent list includes a representation of the second one of the plurality of data types; and
generating by the processor a first consolidation group based on combining the first subtype indicator with the second subtype indicator and comparing the first parent list with the second parent list,
wherein the generating by the processor the first consolidation group comprises selecting by the processor the first subtype indicator based on a ranking selection.

9. The method of claim 8 wherein the data types include eXtensible Markup Language (XML) data types.

10. The method of claim 8 wherein the obtaining the plurality of data type indicators of data types comprises:
obtaining the plurality of data type indicators of data types from a repository of data types.

11. The method of claim 8 wherein the one or more hierarchical subtypes of the each data type include one or more subelements of the each data type represented as a data type element.

12. The method of claim 8 wherein the one or more hierarchical subtypes of the each data type include one or more hierarchical subtypes included in two or more hierarchical levels of a tree representing the each data type.

13. The method of claim 8 comprising:
generating by the processor a third subtype indicator of a third hierarchical subtype associated with a third one of the plurality of data type indicators in a third hierarchical subtype relationship; and
generating by the processor a third parent list including one or more representations of one or more of the plurality of data types associated with the third hierarchical subtype, wherein the third parent list includes a representation of the third one of the plurality of data types, wherein:
generating by the processor the first consolidation group includes generating by the processor the first consolidation group based on combining the first subtype indicator with the third subtype indicator and comparing the first parent list with the third parent list.

14. The method of claim 8 wherein the generating by the processor the first consolidation group comprises:
  generating by the processor the first consolidation group based on combining the first subtype indicator with the second subtype indicator and generating by the processor a first intersection parent list based on an intersection of the first parent list with the second parent list.

15. The method of claim 8 wherein the generating by the processor the first consolidation group comprises:
  deleting by the processor a redundant consolidation group wherein the redundant consolidation group includes a common set of subtype indicators with the first consolidation group and a parent list associated with the redundant consolidation list includes a subset of elements of the first parent list.

16. The method of claim 8 wherein the generating by the processor the first consolidation group comprises:
  selecting by the processor the first subtype indicator based on a ranking value based on $$\text{rank} = \frac{\text{scale}}{w_{pp} + w_{cs} + w_{cc}} \left( w_{pp} \frac{\sqrt{p}}{\sqrt{P}} + w_{cs} \frac{c}{S} + w_{cc} \frac{\sqrt{c}}{\sqrt{C}} \right),$$

wherein
scale indicates a scale value,
wpp, wcs, wcc indicate weight values,
p indicates a number of parents associated with a new entry,
P indicates a maximum number of parents of all entries included in a repository,
c indicates a number of shared subtype indicators,
S indicates a mean number of subtype indicators associated with all parents of the repository, and
C indicates the maximum number of shared subtype indicators of all entries included in the repository.

17. A computer program product being tangibly embodied on a computer-readable medium and being configured to cause a data processing apparatus to:
  obtain a plurality of data type indicators of data types, wherein each data type indicator is associated with one or more hierarchical subtypes of the data type;
  generate a first subtype indicator of a first hierarchical subtype associated with a first one of the plurality of data type indicators in a first hierarchical subtype relationship;
  generate a first parent list including one or more representations of one or more of the plurality of data types associated with the first hierarchical subtype, wherein the first parent list includes a representation of the first one of the plurality of data types;
  generate a second subtype indicator of a second hierarchical subtype associated with a second one of the plurality of data type indicators in a second hierarchical subtype relationship;
  generate a second parent list including one or more representations of one or more of the plurality of data types associated with the second hierarchical subtype, wherein the second parent list includes a representation of the second one of the plurality of data types; and
  generate a first consolidation group based on combining the first subtype indicator with the second subtype indicator and comparing the first parent list with the second parent list,
  wherein the computer program product is configured to cause the data processing apparatus to select the first subtype indicator based on a ranking selection.

18. The computer program product of claim 17 wherein the data types include eXtensible Markup Language (XML) data types.

19. The computer program product of claim 17 wherein the computer program product is configured to cause the data processing apparatus to generate the first consolidation group based on combining the first subtype indicator with the second subtype indicator and generating a first intersection parent list based on an intersection of the first parent list with the second parent list.

20. The computer program product of claim 17 wherein the one or more hierarchical subtypes of the each data type include one or more subelements of the each data type represented as a data type element.

21. A system comprising:
  a processor;
  a model row generator that is operably coupled to the processor and that is configured to cause the processor to:
    obtain a plurality of data type indicators of data types, wherein each data type indicator is associated with one or more hierarchical subtypes of the data type,
    generate a first subtype indicator of a first hierarchical subtype associated with a first one of the plurality of data type indicators in a first hierarchical subtype relationship,
    generate a first parent list including one or more representations of one or more of the plurality of data types associated with the first hierarchical subtype, wherein the first parent list includes a representation of the first one of the plurality of data types,
    generate a second subtype indicator of a second hierarchical subtype associated with a second one of the plurality of data type indicators in a second hierarchical subtype relationship, and
    generate a second parent list including one or more representations of one or more of the plurality of data types associated with the second hierarchical subtype, wherein the second parent list includes a representation of the second one of the plurality of data types; and
  a consolidation engine that is operably coupled to the processor and that is configured to cause the processor to generate a first consolidation group based on combining the first subtype indicator with the second subtype indicator and comparing the first parent list with the second parent list, wherein the consolidation engine is further configured to select the first subtype indicator based on a top-down selection.

22. A method comprising:
  obtaining a plurality of data type indicators of data types, wherein each data type indicator is associated with one or more hierarchical subtypes of the data type;
  generating by a processor a first subtype indicator of a first hierarchical subtype associated with a first one of the plurality of data type indicators in a first hierarchical subtype relationship;
  generating by the processor a first parent list including one or more representations of one or more of the plurality of data types associated with the first hierarchical subtype, wherein the first parent list includes a representation of the first one of the plurality of data types;
  generating by the processor a second subtype indicator of a second hierarchical subtype associated with a second one of the plurality of data type indicators in a second hierarchical subtype relationship;

generating by the processor a second parent list including one or more representations of one or more of the plurality of data types associated with the second hierarchical subtype, wherein the second parent list includes a representation of the second one of the plurality of data types; and generating by the processor a first consolidation group based on combining the first subtype indicator with the second subtype indicator and comparing the first parent list with the second parent list, wherein the generating by the processor the first consolidation group comprises selecting by the processor the first subtype indicator based on a top-down selection.

23. The method of claim 22 comprising:

storing a first entry including the first subtype indicator and the first parent list in a first row included in a consolidation repository;

storing a second entry including the second subtype indicator and the second parent list in the first row; and sorting entries of the first row based on a number of parent entries in each parent list.

24. A computer program product being tangibly embodied on a computer-readable medium and being configured to cause a data processing apparatus to:

obtain a plurality of data type indicators of data types, wherein each data type indicator is associated with one or more hierarchical subtypes of the data type;

generate a first subtype indicator of a first hierarchical subtype associated with a first one of the plurality of data type indicators in a first hierarchical subtype relationship;

generate a first parent list including one or more representations of one or more of the plurality of data types associated with the first hierarchical subtype, wherein the first parent list includes a representation of the first one of the plurality of data types;

generate a second subtype indicator of a second hierarchical subtype associated with a second one of the plurality of data type indicators in a second hierarchical subtype relationship;

generate a second parent list including one or more representations of one or more of the plurality of data types associated with the second hierarchical subtype, wherein the second parent list includes a representation of the second one of the plurality of data types; and generate a first consolidation group based on combining the first subtype indicator with the second subtype indicator and comparing the first parent list with the second parent list, wherein the computer program product is configured to cause the data processing apparatus to select the first subtype indicator based on a top-down selection.

* * * * *